(12) United States Patent
Bertram

(10) Patent No.: US 9,744,683 B2
(45) Date of Patent: Aug. 29, 2017

(54) V GROOVE INSULATION MACHINE

(71) Applicant: Ideal Products of Canada, Edmonton (CA)

(72) Inventor: Robert Bertram, Edmonton (CA)

(73) Assignee: IDEAL PRODUCTS OF CANADA, Edmonton (CA)

( * ) Notice: Subject to any disclaimer, the term of this patent is extended or adjusted under 35 U.S.C. 154(b) by 205 days.

(21) Appl. No.: 14/191,855

(22) Filed: Feb. 27, 2014

(65) Prior Publication Data

US 2015/0239142 A1     Aug. 27, 2015

(51) Int. Cl.

| | |
|---|---|
| *B26D 7/32* | (2006.01) |
| *B32B 1/08* | (2006.01) |
| *B32B 38/18* | (2006.01) |
| *B32B 37/00* | (2006.01) |
| *B32B 5/18* | (2006.01) |
| *B32B 7/12* | (2006.01) |
| *B32B 15/20* | (2006.01) |
| *B32B 38/00* | (2006.01) |
| *B32B 37/12* | (2006.01) |

(Continued)

(52) U.S. Cl.
CPC .................. *B26D 7/32* (2013.01); *B32B 1/08* (2013.01); *B32B 5/18* (2013.01); *B32B 7/12* (2013.01); *B32B 15/20* (2013.01); *B32B 37/0046* (2013.01); *B32B 38/18* (2013.01); *B26F 1/3813* (2013.01); *B26F 3/004* (2013.01); *B32B 37/12* (2013.01); *B32B 37/203* (2013.01); *B32B 38/0004* (2013.01); *B32B 2262/10* (2013.01); *B32B 2262/101* (2013.01); *B32B 2607/00* (2013.01); *Y10T 83/0448* (2015.04); *Y10T 83/202* (2015.04); *Y10T 156/1066* (2015.01); *Y10T 156/17* (2015.01)

(58) Field of Classification Search
CPC ............... Y10T 83/202; Y10T 83/2044; Y10T 83/2057; Y10T 83/2061; Y10T 83/2117; B65B 35/56; B65B 35/58; B65B 63/00; B65B 35/46; B65B 5/10; B65G 47/086
USPC ....... 414/758, 773, 762, 764, 765, 767, 771; 198/429, 430, 456, 457.06, 457.07, 468.9; 53/513, 520, 455
See application file for complete search history.

(56) References Cited

U.S. PATENT DOCUMENTS

| | | | |
|---|---|---|---|
| 4,838,968 A | 6/1989 | Nelson | |
| 5,360,306 A * | 11/1994 | Nakayama | ............. B65G 65/00 198/419.1 |

(Continued)

FOREIGN PATENT DOCUMENTS

| | | | |
|---|---|---|---|
| GB | 921571 A * | 3/1963 | ........... B65G 47/086 |
| GB | 1328391 | 8/1973 | |

(Continued)

OTHER PUBLICATIONS

Office Action issued in corresponding Canadian Patent Application No. 2,879,611 on May 30, 2016, consisting of 3 pp.

*Primary Examiner* — Jonathan Riley
(74) *Attorney, Agent, or Firm* — Volpe and Koenig, P.C.

(57) ABSTRACT

A machine for forming insulating panels from pieces includes a moving device with pieces thereon, where every other piece is upside down from a position that is desired and a flipping zone comprising a flipping machine. The flipping machine rotates the upside down pieces 180 degrees and releases the now right side up pieces for further processing.

18 Claims, 18 Drawing Sheets

(51) Int. Cl.
*B32B 37/20* (2006.01)
*B26F 1/38* (2006.01)
*B26F 3/00* (2006.01)

(56) References Cited

U.S. PATENT DOCUMENTS

| | | | | |
|---|---|---|---|---|
| 5,395,207 | A | * | 3/1995 | Hoffman ............... B65G 47/086 414/761 |
| 5,725,723 | A | * | 3/1998 | Cusick .................. B23D 47/042 156/258 |
| 8,506,735 | B2 | | 8/2013 | Whitaker et al. |

FOREIGN PATENT DOCUMENTS

| | | |
|---|---|---|
| JP | H02-178112 A | 7/1990 |
| JP | H04-156314 A | 5/1992 |

\* cited by examiner

V GROOVE INSULATION MACHINE

BACKGROUND

Pipes are often insulated using an insulating layer. Pipe insulation layers may be formed using spray-on insulation, preformed insulation, and grooved insulation. Spray on insulation is messy and often cannot yield consistent thicknesses. This leads to hot and cold spots, and if visible, an undesirable appearance. Preformed insulation is more costly, and also of course, pre-formed insulation can only be applied to pipes of the size it is manufactured for.

Known grooved insulation involves taking a sheet of panel or board insulation and cutting a series of grooves in it to allow it to uniformly bend around a pipe. Such cuts have a few problems. First, the cuts may not be accurate and thus gapping may occur in the insulation, allowing heat transfer through the pipe. Second, every groove that is cut results in wasted material. For example, as shown in FIG. 1, cutting pieces 92 to form an insulation panel 90 results in leftover removed sections 94, which are discarded.

The waste from the removed sections and lack of uniform cuts is something the subject matter of the present application seeks to address. The machine disclosed herein is also capable of moving insulation and insulation pieces between stations in a way that is advantageous.

SUMMARY

A machine for forming insulating panels from pieces includes a moving device with pieces thereon, where every other piece is upside down from a position that is desired and a flipping zone comprising a flipping machine. The flipping machine rotates the upside down pieces 180 degrees and releases the now right side up pieces for further processing.

DETAILED DESCRIPTION OF THE PREFERRED EMBODIMENTS

Figure 1:
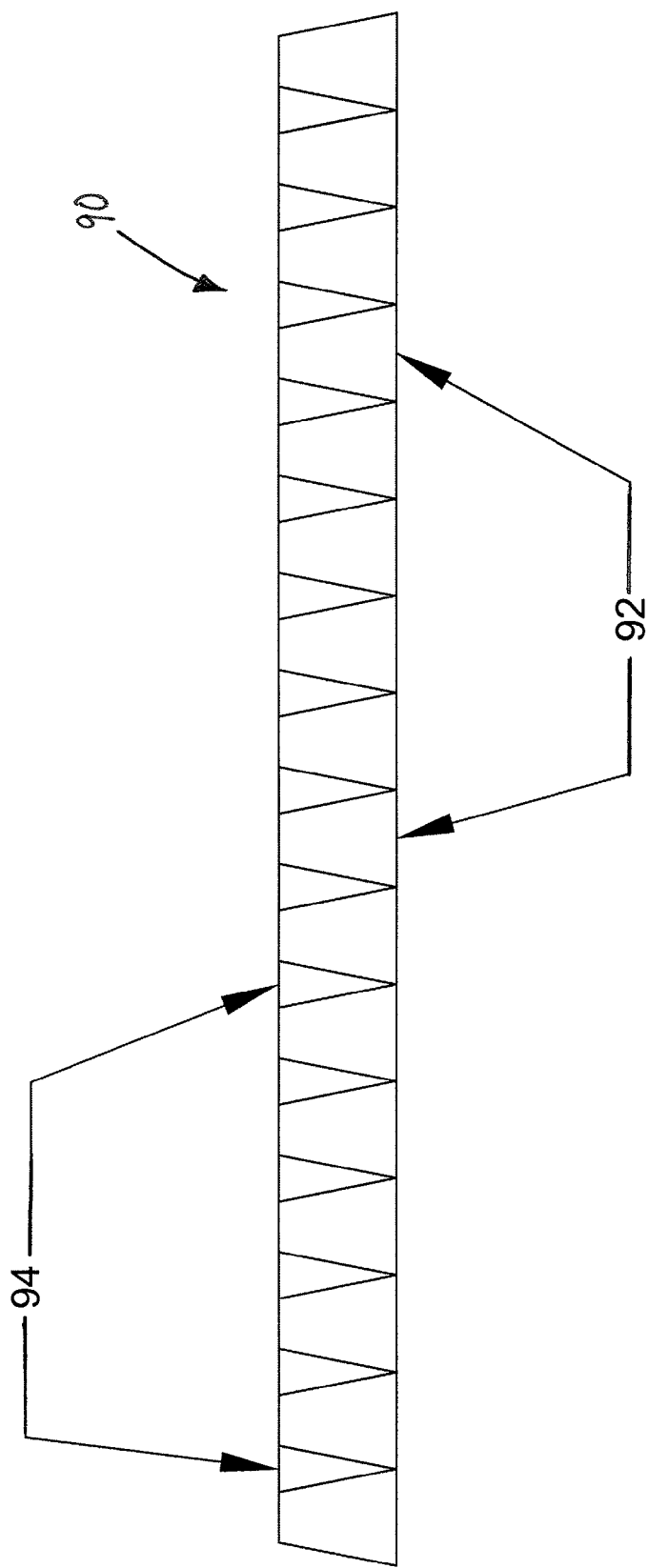
FIG. 1 is a side elevation view of a prior art insulation panel.
Figure 2:
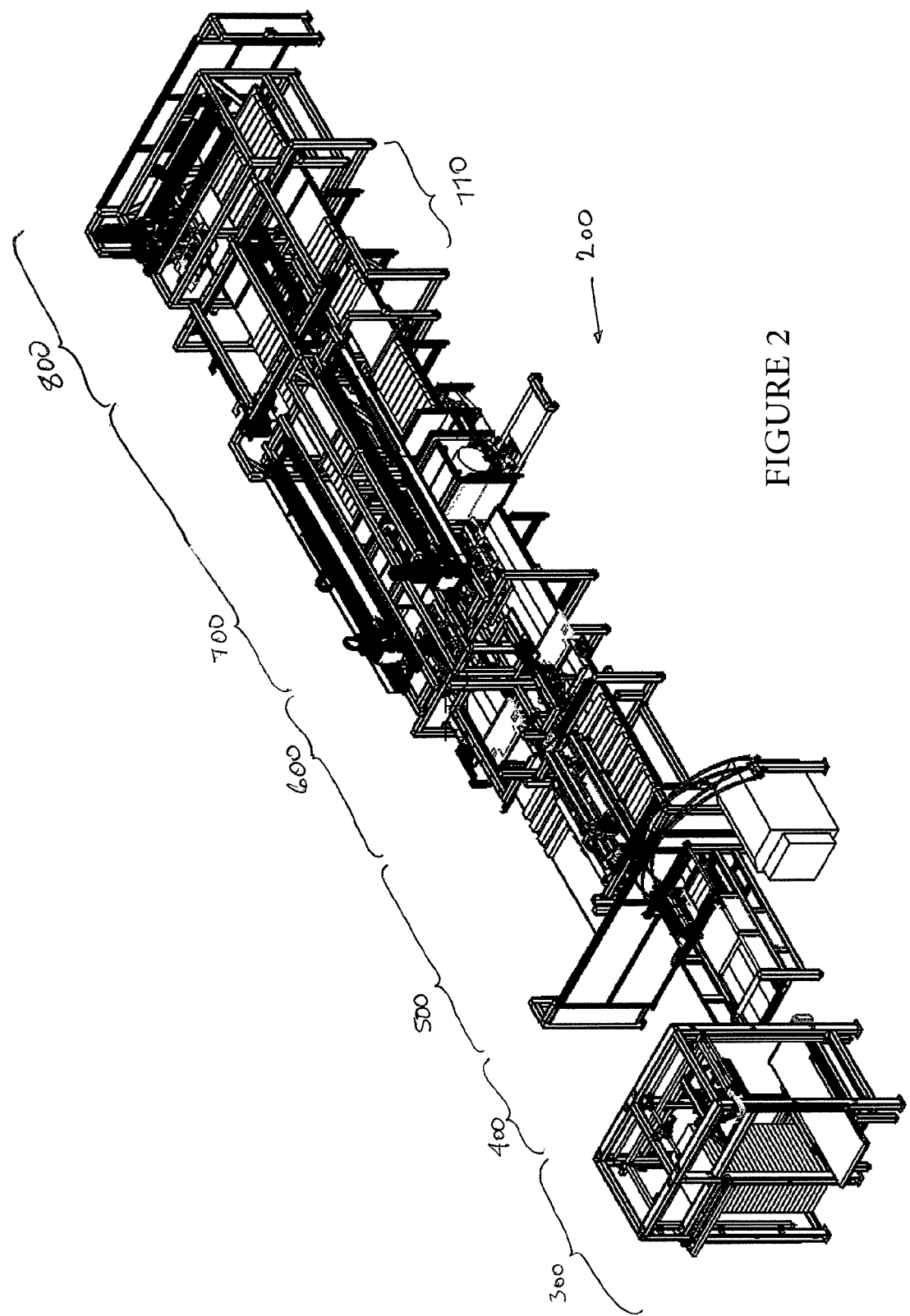
FIG. 2 is a perspective overview of the V-groove insulation machine.

A machine for producing V groove insulation is shown in the appended Figures. The machine 200 comprises several zones, as shown in FIG. 2, each of which will be discussed in turn. The zones preferably include a stacking/unstacking zone 300 where an uncut panel is unstacked, loaded onto a moving device, and assembled; a cutting zone 400 where the unfinished panels are cut into pieces; a flipping zone 500 where the pieces are flipped; an accumulator zone 600 where the cut pieces are gathered; an adhesive zone 700 where adhesive and backing are applied to the pieces to form a single panel; and an unloading area 800 where the final panels are gathered for removal from the machine 200.

Stacking/Unstacking Zone 300

Figure 3:
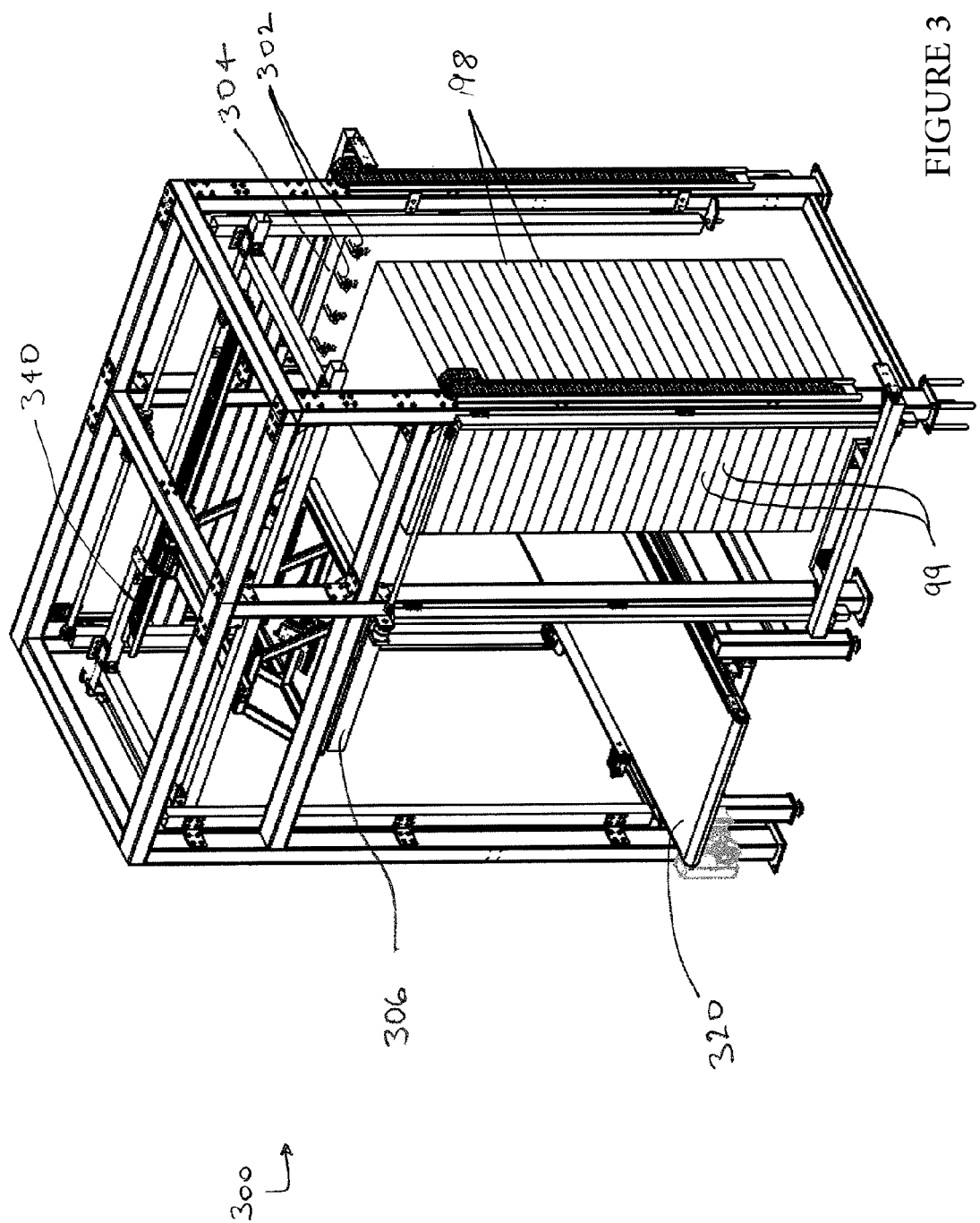
FIG. 3 is a perspective view of the stacking/unstacking zone.

As shown in FIG. 3, within the stacking/unstacking zone 300, a stack of unfinished panels 98 are loaded into the V groove machine 200. The stack of panels 98 may have an adhesive applied to one or more ends faces 99 thereof using adhesive nozzles 302 that articulate along the panels 98 on movable arms 304 on opposite sides of the panel 98. This application of the adhesive to the panels' end faces 99 allows successive panels to be joined together end to end and form a continuous feed into the machine 200 for higher throughput.

The panels 98 may be made from any known material in the art for forming insulation panels, including, without limitation, mineral fiber, glass fiber, cellular foam, and/or aerogel (as well as other materials), and the adhesive for the stacking zone may be any type of adhesive capable for joining successive panels together, including, without limitation, a spray on pressure sensitive type adhesive or other similar type of adhesive.

After the adhesive application, a stacking head 306 that rides on rails 340 articulates over the panel stack and lifts the uppermost of the unfinished panels 98 from the stack. The stacking head 306 does this lifting using a head and pin mechanism that will now be described in greater detail, with an understanding that the head and pin mechanism described hereafter may be of the same design as other heads used throughout the machine 200.

Figure 4:
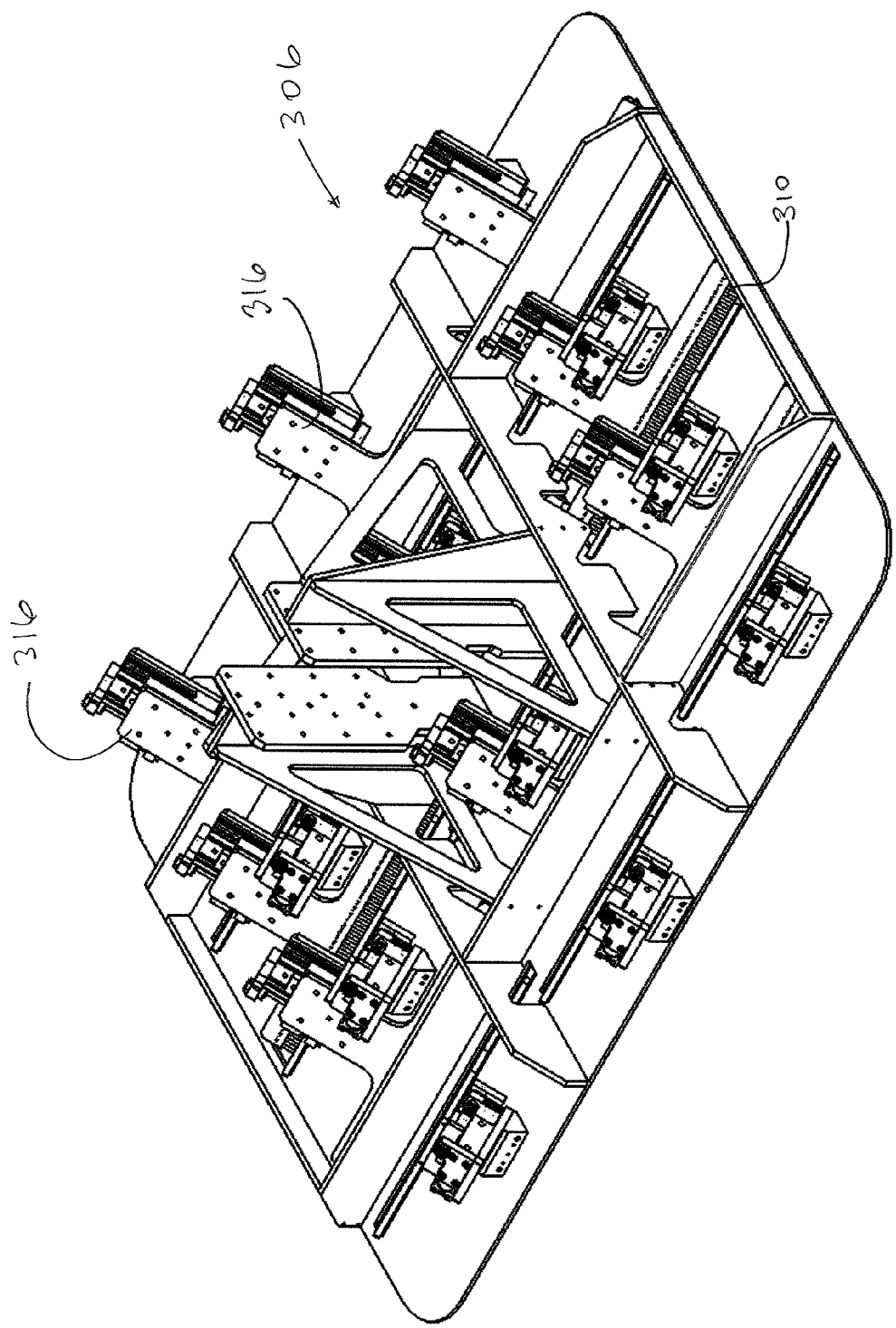
FIGS. 4 and 5 are perspective views above and below a stacking head.
Figure 5:
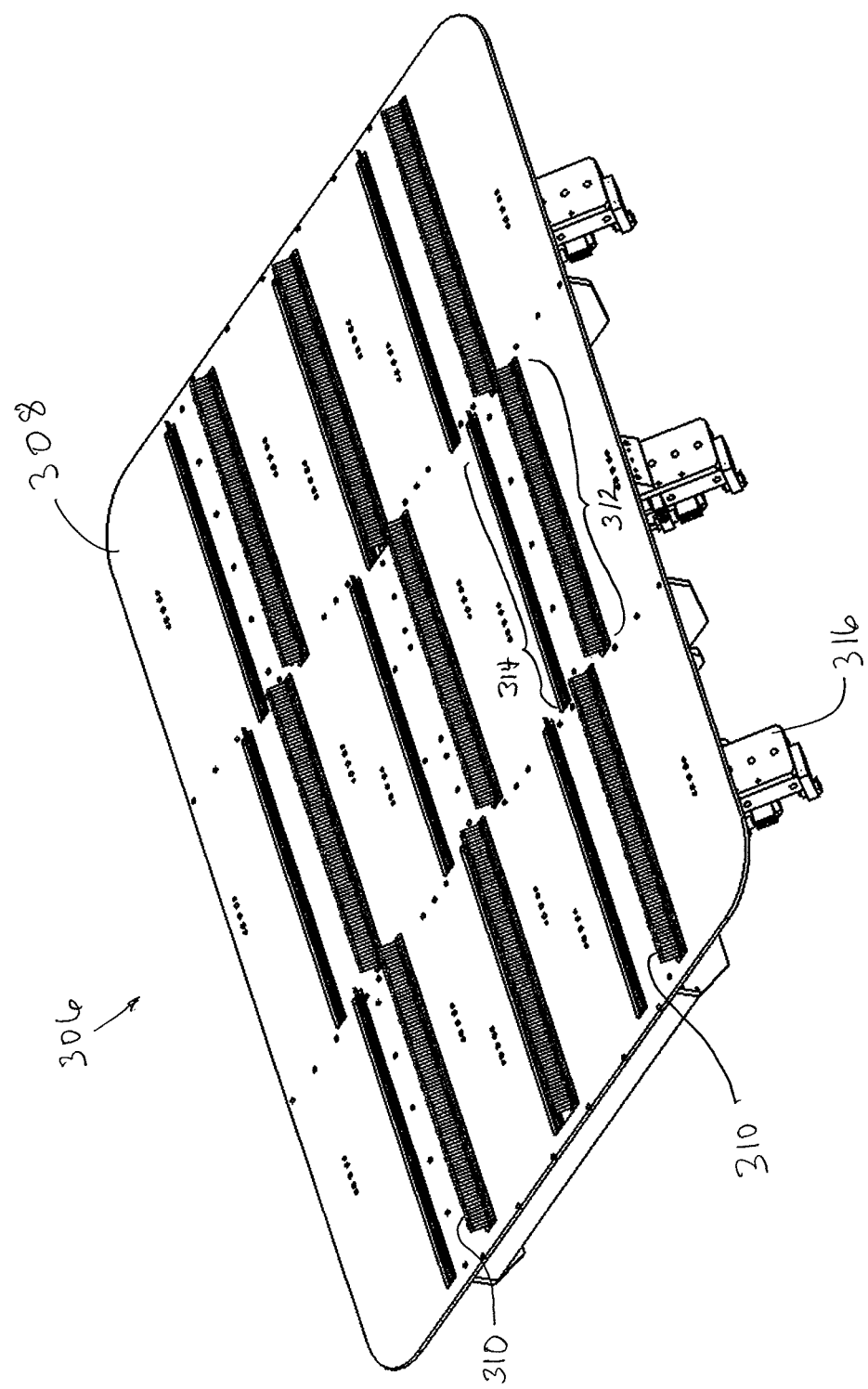

As shown in FIGS. 4 and 5, the stacking head 306 comprises a lifting face 308 that is lowered onto the panel stack 98. Once pressed onto the panel stack 98, where an optical or pressure sensor may ensure adequate pressure, the stacking head 306 deploys a plurality of pins 310 through a lifting face 308 and into the topmost unfinished panel 98. These pins 310, once engaged with the panel 98, secure the panel 98 to the lifting face 308, and the stacking zone head 306 withdraws upwards and preferably moves the panel 98 from the stack to above a moving device, such as a conveyor 320, and then lowers the panel 98 to the conveyor 320. As shown, the pins 310 extend into a panel's 98 top surface, but pins that extend into a side thereof, or fingers that engage the panel may also be used. The pin arrangement described herein has been found to be reliable compared to the other methods, especially for engaging individual pieces after the cutting zone 400 (described below).

As can be seen in one layout in FIG. 5, the pins 310 extend in groups, with some pin groups facing one direction (312) and other pin groups facing a direction opposite the first group (314). As shown in FIG. 4, a pin head 316 drives and retracts the pins 310, depending on whether the stacking head 306 is lifting or dropping off a panel 98. Preferably, all of the pin heads 316 extend or retract at the same time, upon receipt of a signal from a controller (not shown). Alternatively, the controller may signal selective pin heads 316 to extend or retract.

Once the panel 98 is placed above or on the conveyor 320, the stacking head 306 withdraws the pins 310, releasing the panel 98 and the stacking head 306 begins its cycle to secure another panel 98 from the stack, leaving the formerly topmost panel 98 on the conveyor 320. The conveyor 320 moves the panel 98 down the assembly line to a cutting zone 400, described below. Prior to reaching the cutting zone 400, the panels 98 on the conveyor 320 are preferably joined end to end, preferably due to the adhesive applied in the stacking zone 300, to form a continuous panel feed 98a through the machine 200.

Cutting Zone 400

Figure 6:
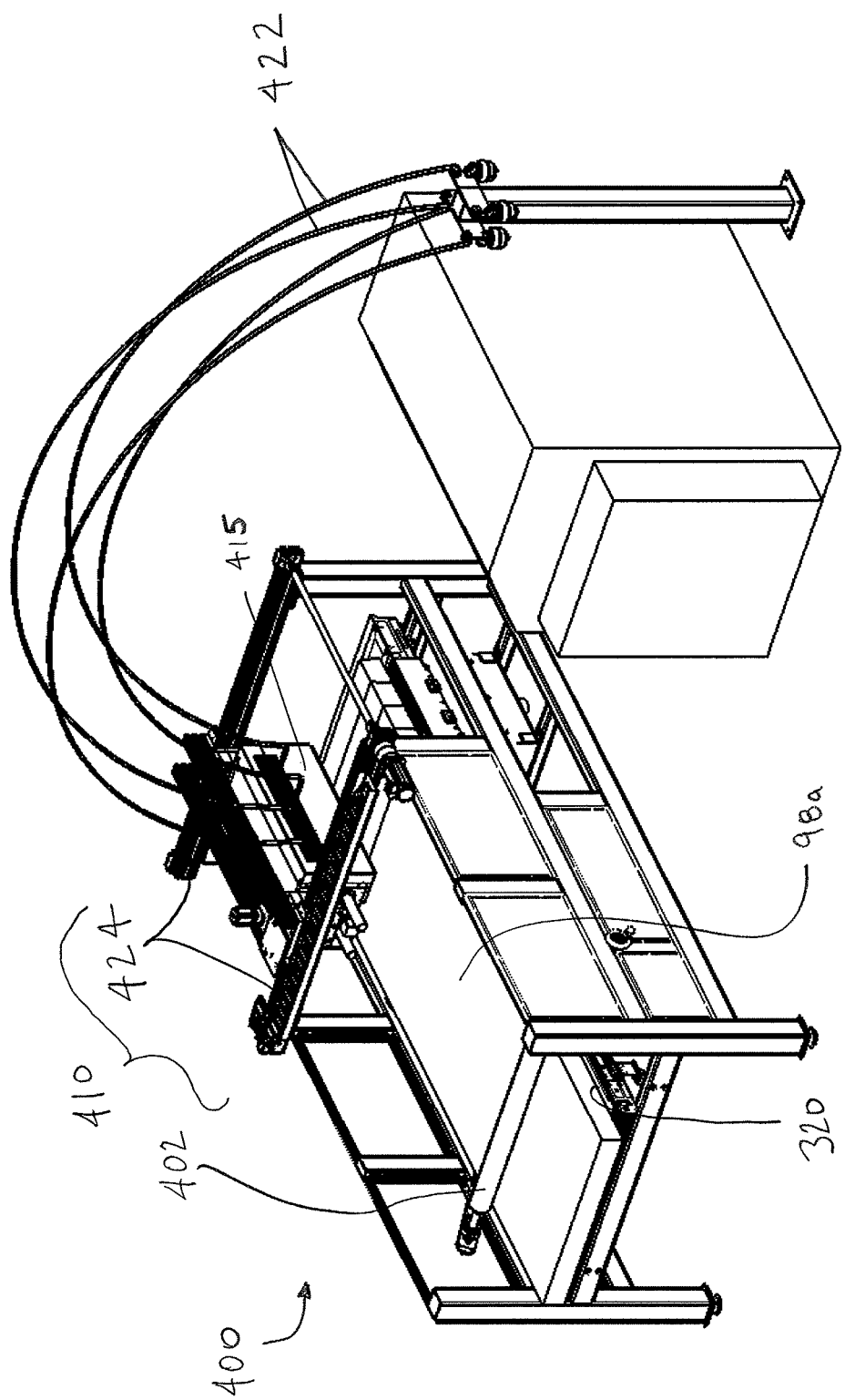
FIG. 6 is a perspective view of the cutting zone.

As shown in FIG. 6, at the cutting zone 400, the continuous panel feed 98a is prepared for separation into individual insulation pieces. Upon arrival in the cutting zone 400, a roller bar 402 settles against the continuous panel feed 98a to hold it against the conveyor 320 and stabilize the continuous panel feed 98a for the cutting operation.

Figure 6A:
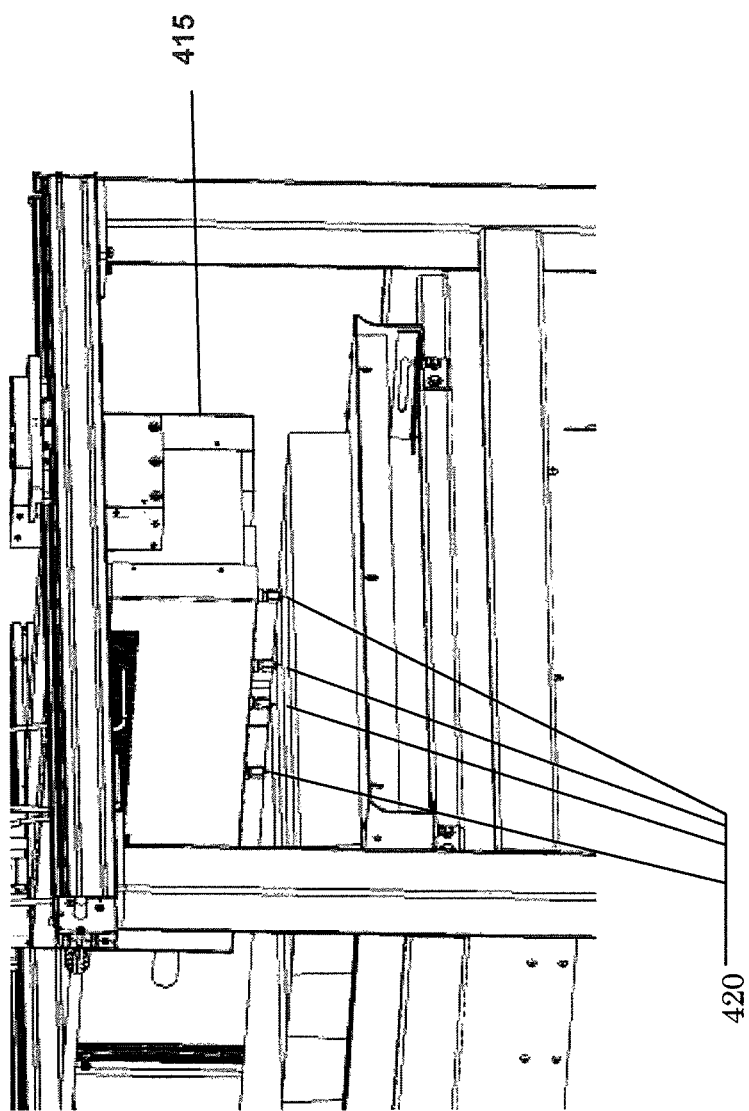
FIG. 6A is a perspective view of the cutting head and water jet cutting nozzles.
Figure 7:
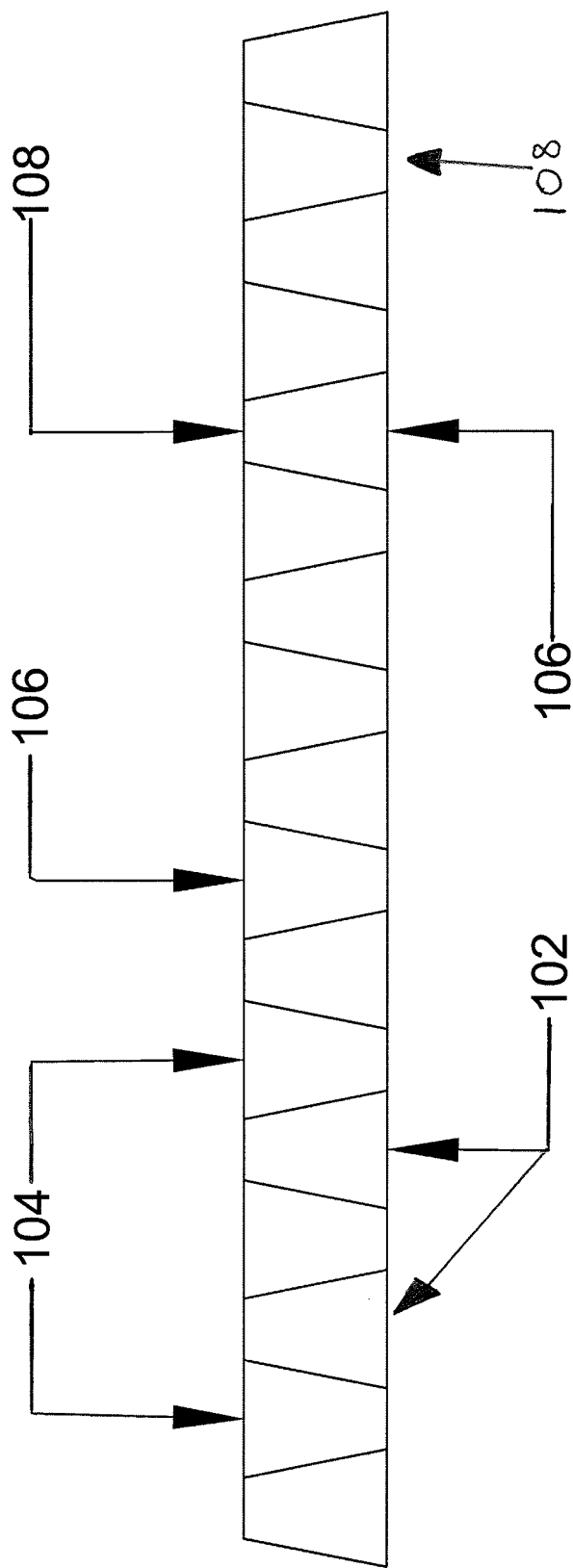
FIG. 7 is a side elevation view of the cut pieces.

In the cutting operation, a cutting machine 410 preferably includes a cutting head 415. The cutting head 415 that preferably has one or more precise high pressure water jet cutting nozzles 420 that are fed by a high pressure water pump via lines 422 that attach to the nozzles 420. For example and without limitation, the high pressure water jet nozzles 420 can be fine orifice nozzles having a water pressure of approximately 60,000 psi and a maximum water flow of 1.3 gpm. FIG. 6A shows four waterjet cutting nozzles 422, although other numbers of nozzles 420 are within the spirit and scope of the invention. The nozzles 420 preferably cut completely through the continuous panel feed 98a at a predefined angle, by preferably moving the head 415 and nozzles 420 perpendicular to the conveyor 320 along rails 424, while the nozzles 420 direct high pressure water through the continuous panel feed 98a to cut it into pieces 102, 104. The cut angle through the continuous panel feed 98a can vary depending on the size requirement for the finished panel. The cuts are preferably made in alternating fashion from either side continuous panel feed 98a in a direction perpendicular to the continuous panel feed 98a. The result preferably being the opposed trapezoid-shaped insulation pieces 102, 104 shown in FIG. 7; however, one of ordinary skill in the art will appreciate that various shaped pieces 102, 104 is within the spirit and scope of the invention.

Although the cutting has been described using high pressure water nozzles 420, other cutting methods may be used including, without limitation, using saw blades to cut the pieces 102, 104, straight edge instruments, or laser cutting technology.

A common backing is preferably applied to the longer side face 106 of the trapezoid pieces 102, 104 for the resulting product. Thus, as the pieces 102, 104 lie in FIG. 7, the longer side face 106 of every other piece 102, 104 is facing in the opposite direction, i.e., its short side face 108 is facing in the direction that its neighboring piece's long side face 106 is facing. This problem is addressed in the flipping zone 500.

Flipping Zone 500

Figure 8:
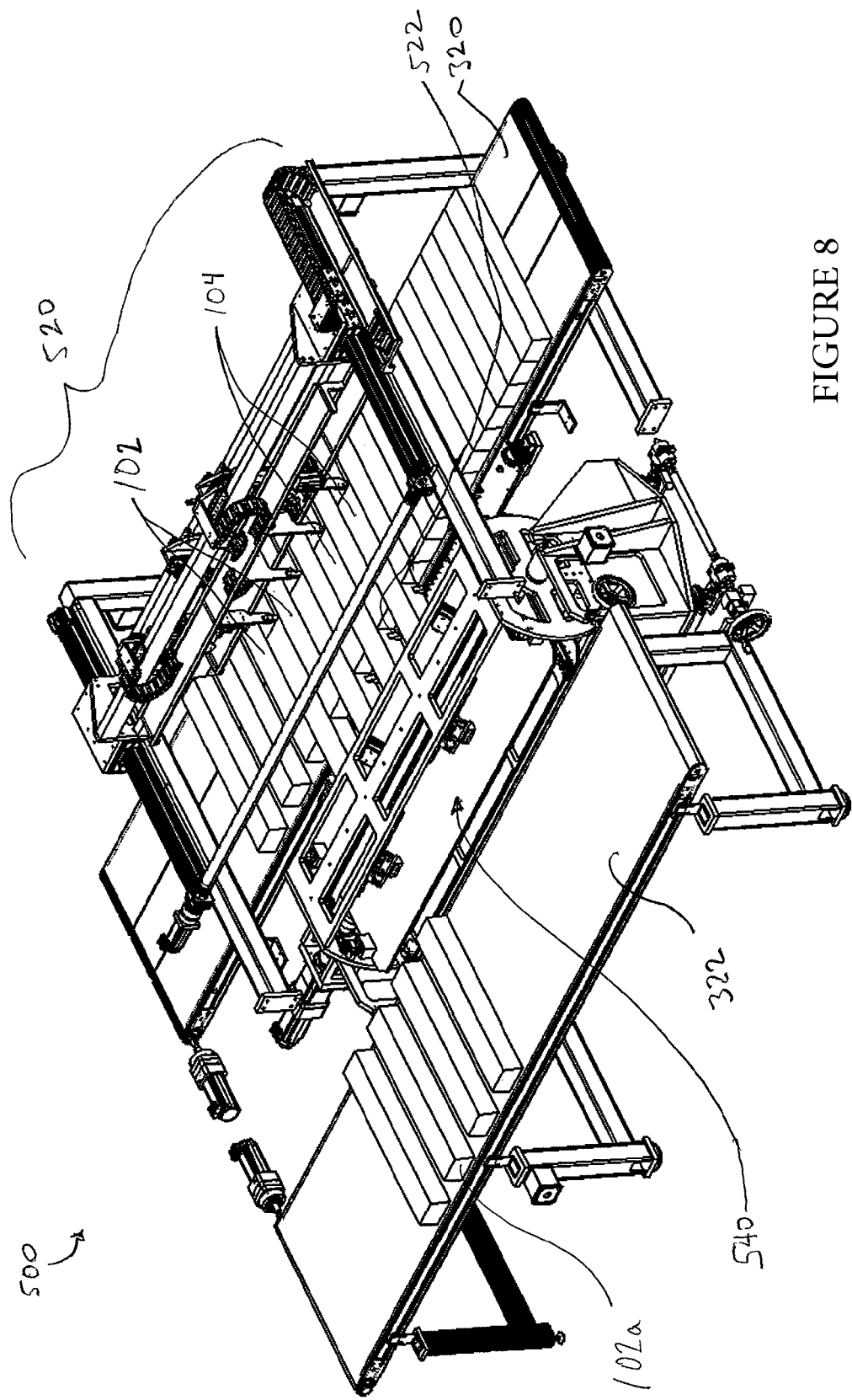
FIGS. 8, 9, 10, 10A, 11, and 12 are perspective views of the flipping station.

In the flipping zone 500 shown in FIG. 8, every other piece 102 or 104—in this case, the pieces that are long side face 106 up (i.e., pieces 104) are flipped over and placed on an adjacent conveyor 322. In overview, a separation machine 520 separates the short side face 108 up pieces 102 from the long side face 106 up pieces 104 (for example, as arranged in FIG. 7) by sliding pieces 104 through aligned fingers 522 and into the flipping machine 540, which secures the pieces 104 within it, and rotates them 180 degrees around an axis 552 of the flipping machine 540, depositing the now right side up pieces 102a onto the second conveyor 322.

Figure 9:
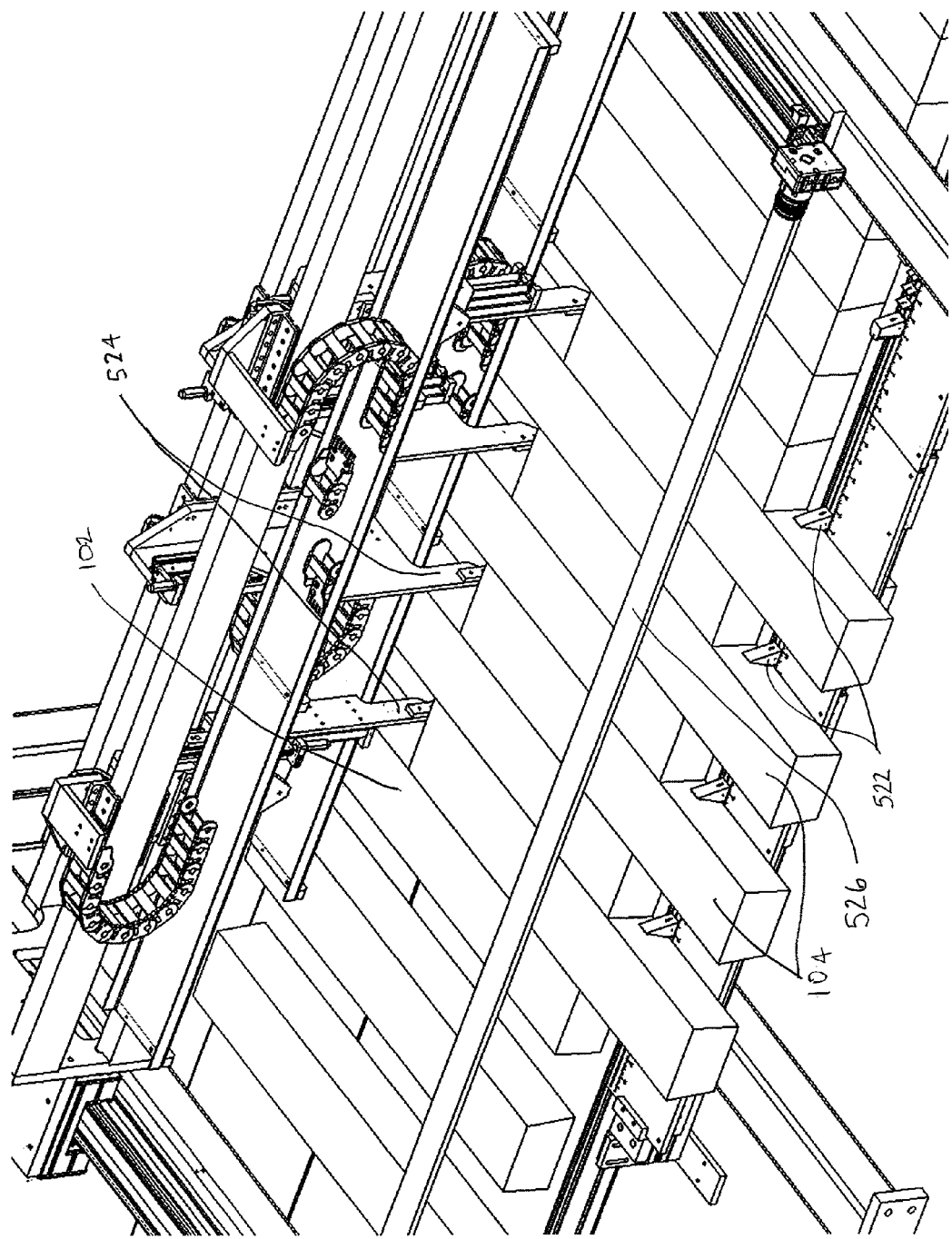

Given that overview, the specifics of the flipping zone 500 will now be explained. As the cut pieces 102, 104 arrive at the separation machine 520, shown close up in FIG. 9, one or more pressing arms 524 (for example, four arms 524 are shown in the figures) articulate across the conveyor face 320. The arms 524 are preferably separated by a distance that is the width of approximately two of the pieces 102, 104, such that the arms 524 push every other piece 104 across the conveyor 320. As the pieces 104 are pushed across the conveyor 320, fingers 522 act to prevent adjacent pieces 102 from entering the flipping machine 540, since the goal is to only flip the long side face 106 up pieces 104. The fingers 522 are angled such that only pieces 104 that are long side face 106 up can pass, while the remaining short side face up pieces 102 remain on the conveyor 320.

The arms 524 and fingers 522 are adjustable to allow for different sizes of pieces 102, 104. Thus, the arms 524 and fingers 522 may be separated by a greater distance from each other if the pieces 102, 104 are larger, or spaced smaller, of course, for smaller piece 102, 104 size.

Figure 10:
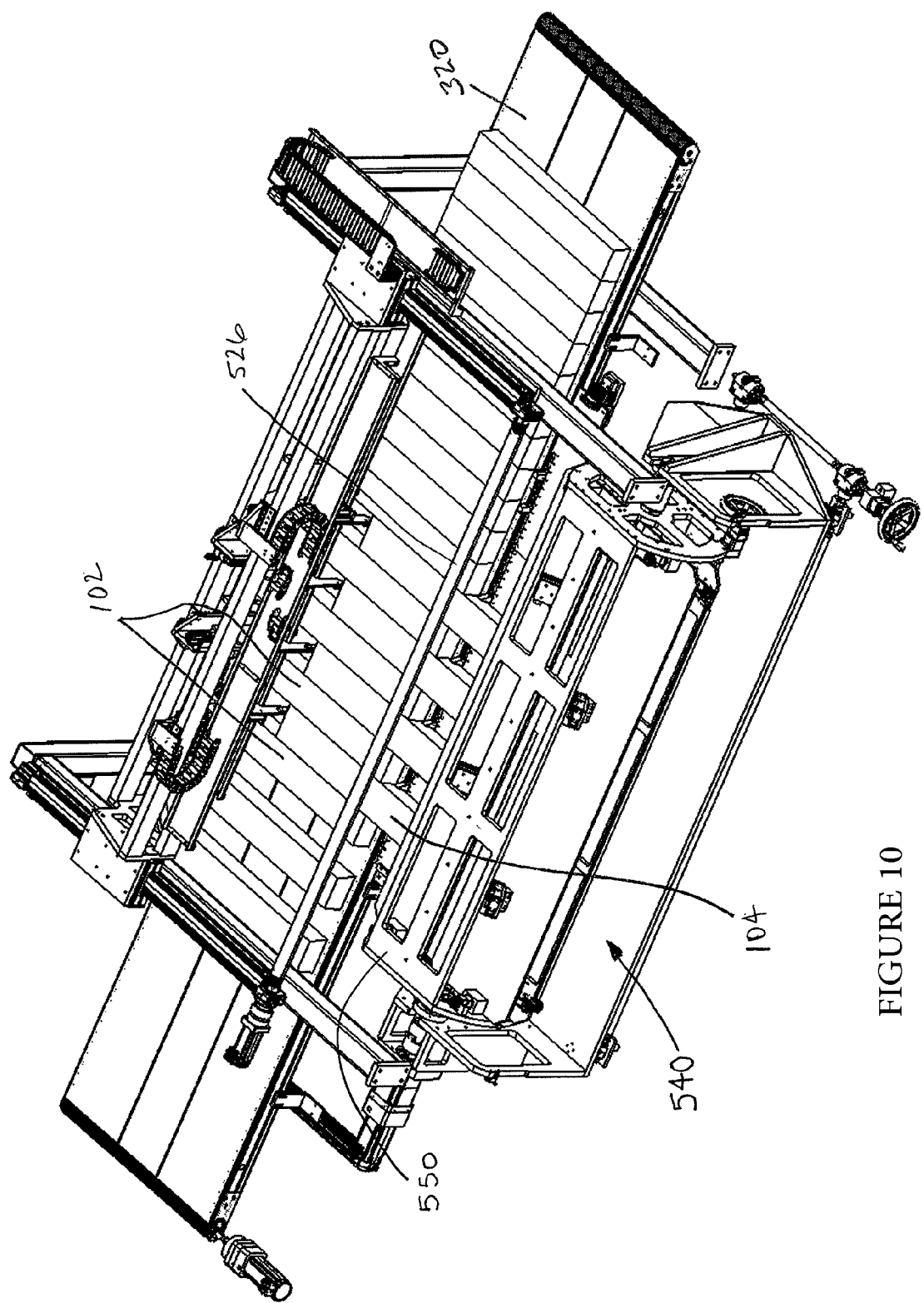
Figure 10A:
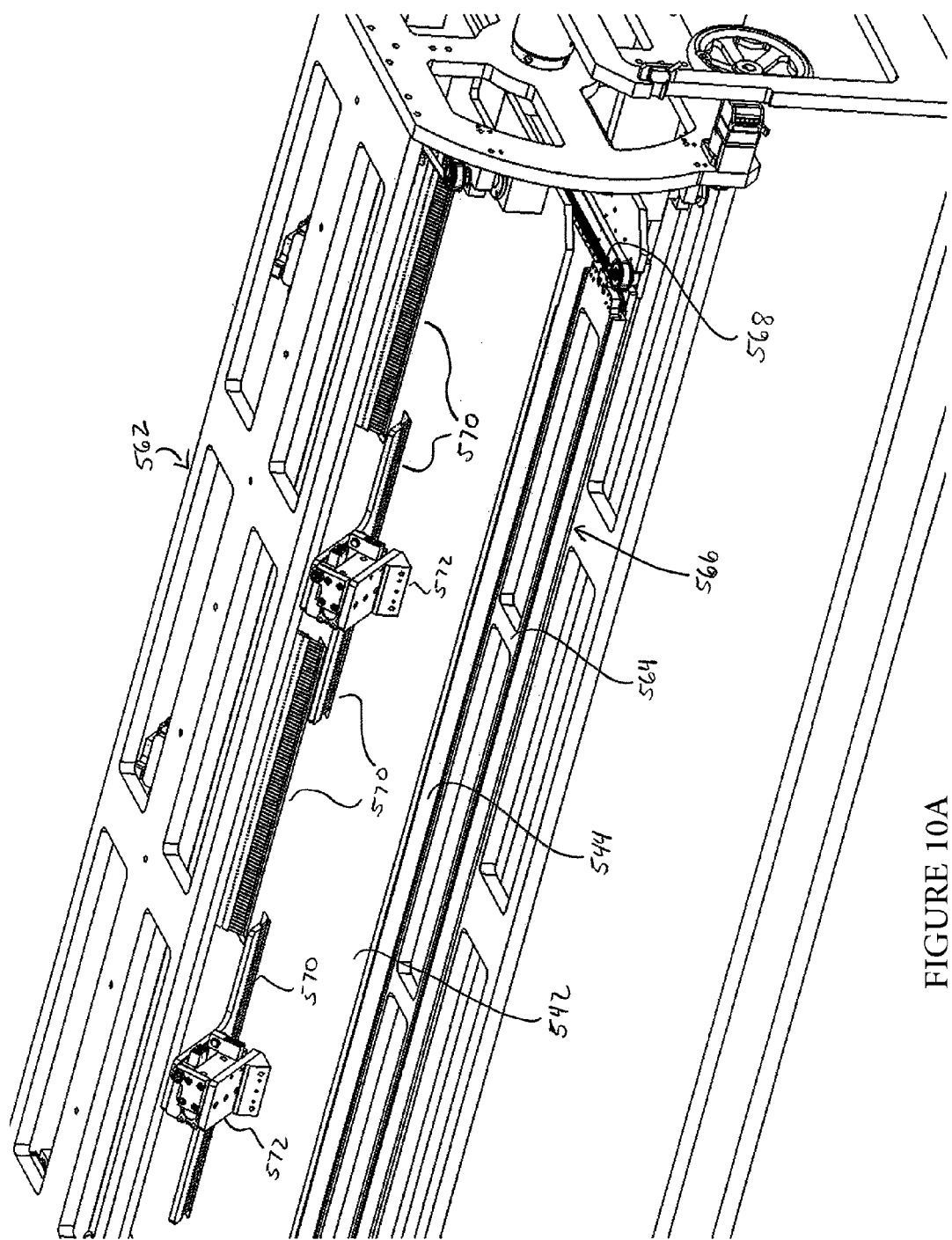
Figure 11:
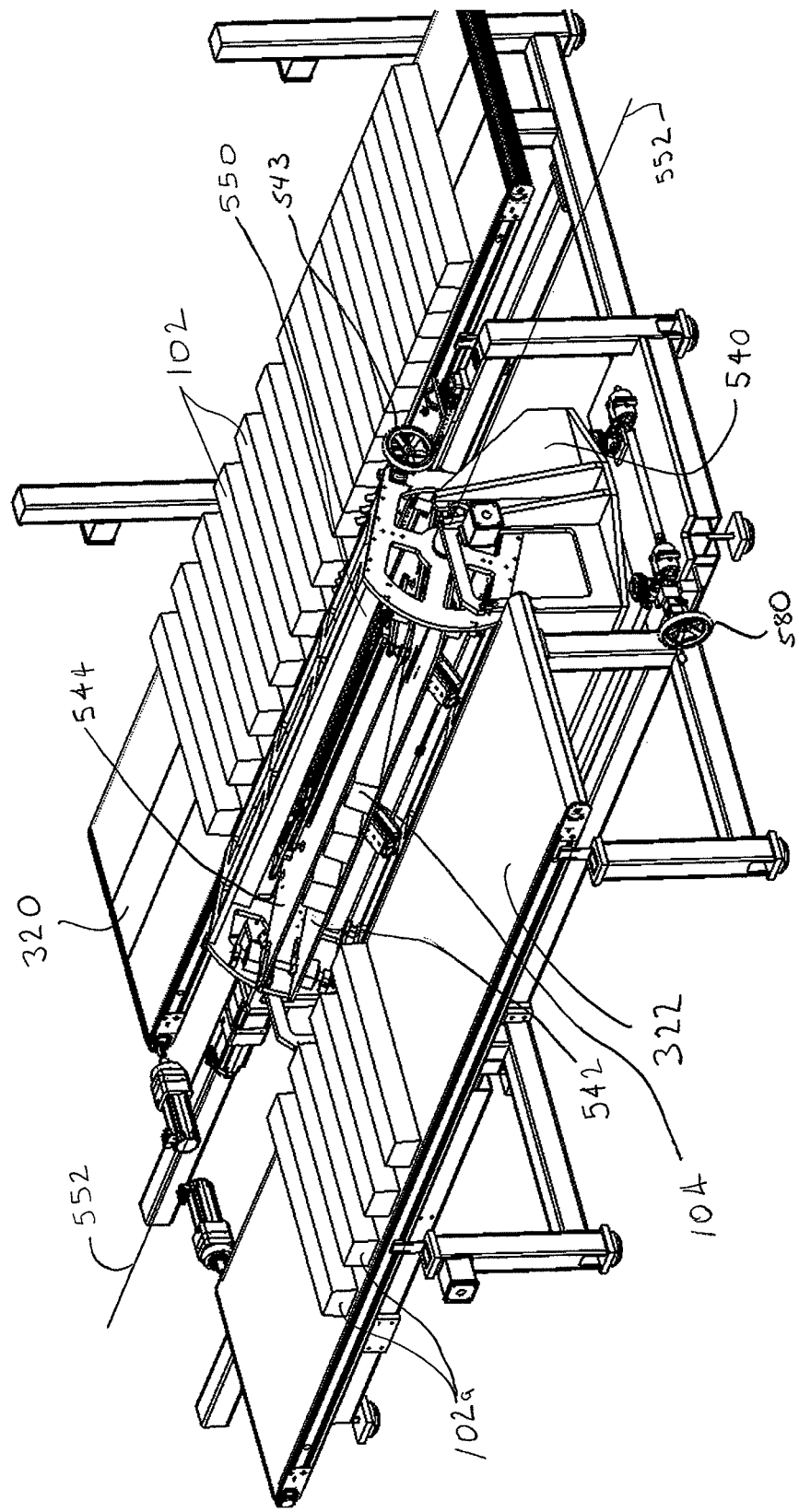

As shown in FIGS. 10 and 10A, the pieces 104 are pushed towards the flipping machine 540 under a roller arm 526 that holds the pieces 104 firmly as they enter the flipping machine 540. The pieces 104 preferably enter the flipping machine 540 between opposing first and second plates 542, 544. When the pieces 104 first enter the flipping machine 540, the first plate 542 is positioned above the second plate 544. The thickness between the plates can be manually set by handwheel 543. Alternatively, the plates 542, 544 may have a preset stopping point to engage the pieces 104, or the plates 542, 544 could operate on a pressure or optical sensor to adjust for different piece thicknesses.

The pieces 104 are preferably inserted into a first end 562 of the flipping machine 540 until they contact a bar 564 at a second end 566 of the flipping machine 540. The bar 564 is movable between the first and second ends 562, 566 of the flipping machine 540 by one or more driving mechanisms, such as a belt 568 shown in FIG. 10. Once the pieces 104 are within the flipping machine 540, pins 570 driven by one or more pin heads 572 contact the pieces 104, in a manner similar to pins 310 and pin heads 316 in the stacking zone head 306, and extend into pieces 104 to secure them for flipping. Alternatively the first plate 542 can articulate towards the second plate 544, or vice-versa, until it secures the pieces 104 between both plates 542, 544.

With the pieces 102 positioned between the plates 542, 544, the flipping machine 540 rotates its body 550 by approximately 180 degrees around an axis 552 until the first plate 542 is now beneath the pieces 104 and also beneath the second plate 544. In other words, the first plate 542 is now level with the conveyor 322. The first plate 542 (now on the bottom) becomes level with the conveyors 320, 322. The first plate 542 can be manually re-leveled with conveyor 322 by adjusting the height of the flipping machine 540, such as by using adjusting handwheel 580. Alternatively, the flipping machine 540 can automatically re-level the first plate 542 using sensors (not shown). Once the plates 542, 544 are properly leveled with the conveyors 320, 322, it is unnecessary to re-level. At this point, the pins 570 or plates 542, 544 release their hold on the pieces 104 and the bar 564 pushes the pieces 104 onto the conveyor 322, where for convenience sake, they are now numbered as 102a, indicating that they are now short side face up 108, and aligned like pieces 102 on conveyor 320. At this point, the flipping machine 540 is ready to receive more pieces from the conveyor 320.

As shown, the flipping machine 540 flips the pieces 104 about its own axis 552 but the pieces 104 could also be rotated about their own axis and placed on the conveyor 320—stated another way, two conveyors may not be necessary if the flipping machine 540 operates to rotate pieces 104 about their own axes. The pieces 104 could also be flipped within the flipping machine 540 by rotating the machine about an axis orthogonal to the axis 552 and placing the pieces on either of conveyors 320, 322.

The pieces 102, 102a are now both oriented with their long side face 106 down, and move through the remaining zones in parallel.

Accumulation Zone 600

After the flipping operation, adjacent pieces 102, 102a on the conveyors 320, 322 are separated by a gap 601. The accumulation zone 600 closes this gap 601 and brings the pieces 102 together with themselves and the pieces 102a together with themselves.

Figure 12:
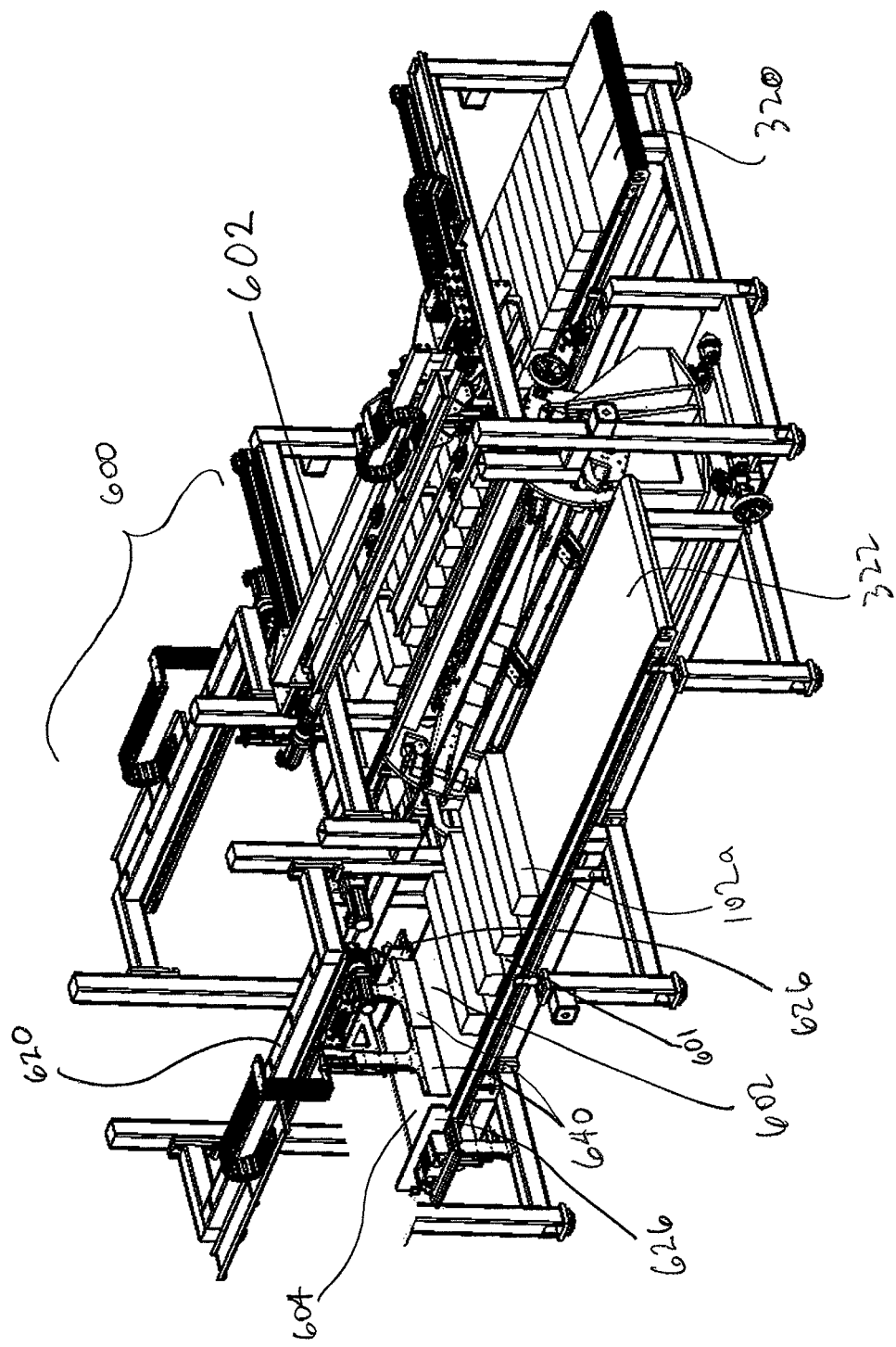
Figure 13:
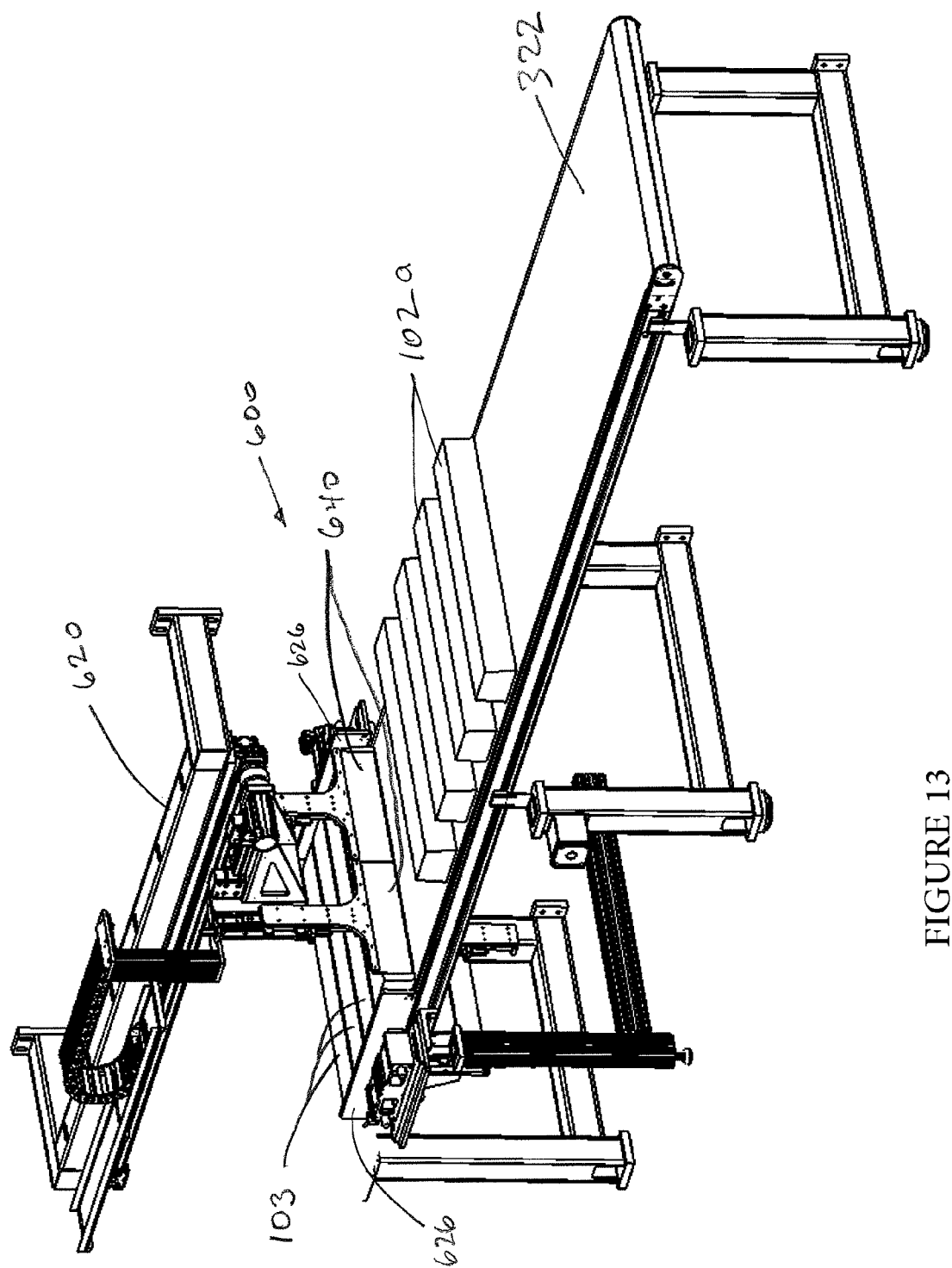
FIG. 13 is a perspective view of the accumulation zone.

FIGS. 12 and 13 show the accumulation zone 600, which includes the accumulation machine 620. For convenience sake, the path of the pieces 102a will be described but it should be understood that the same process is taking place with the pieces 102 until the conveyor lines 320 and 322 form one line again in the unloading area 800.

As separated pieces 102a travel along the conveyor 322, paddles 640 are lowered at preset intervals, as shown. Once lowered, the conveyor 322 keeps moving, and the pieces 102a then backup, or gather together, in an area 602 in front of the paddles 640. Preferably after a plurality of pieces are gathered, such as four pieces shown in FIGS. 12 and 13, the paddles 640 are raised, and the accumulated pieces 103 move to an alignment area 604, where alignment guides 626 align the accumulated pieces 103 so that their edges are lined up for the adhesive zone 700.

Although the accumulation zone 600 gathers the pieces 102a as described, the pieces 102a may also be gathered by placing them together individually or in a group.

Adhesive Zone 700

Figure 14:
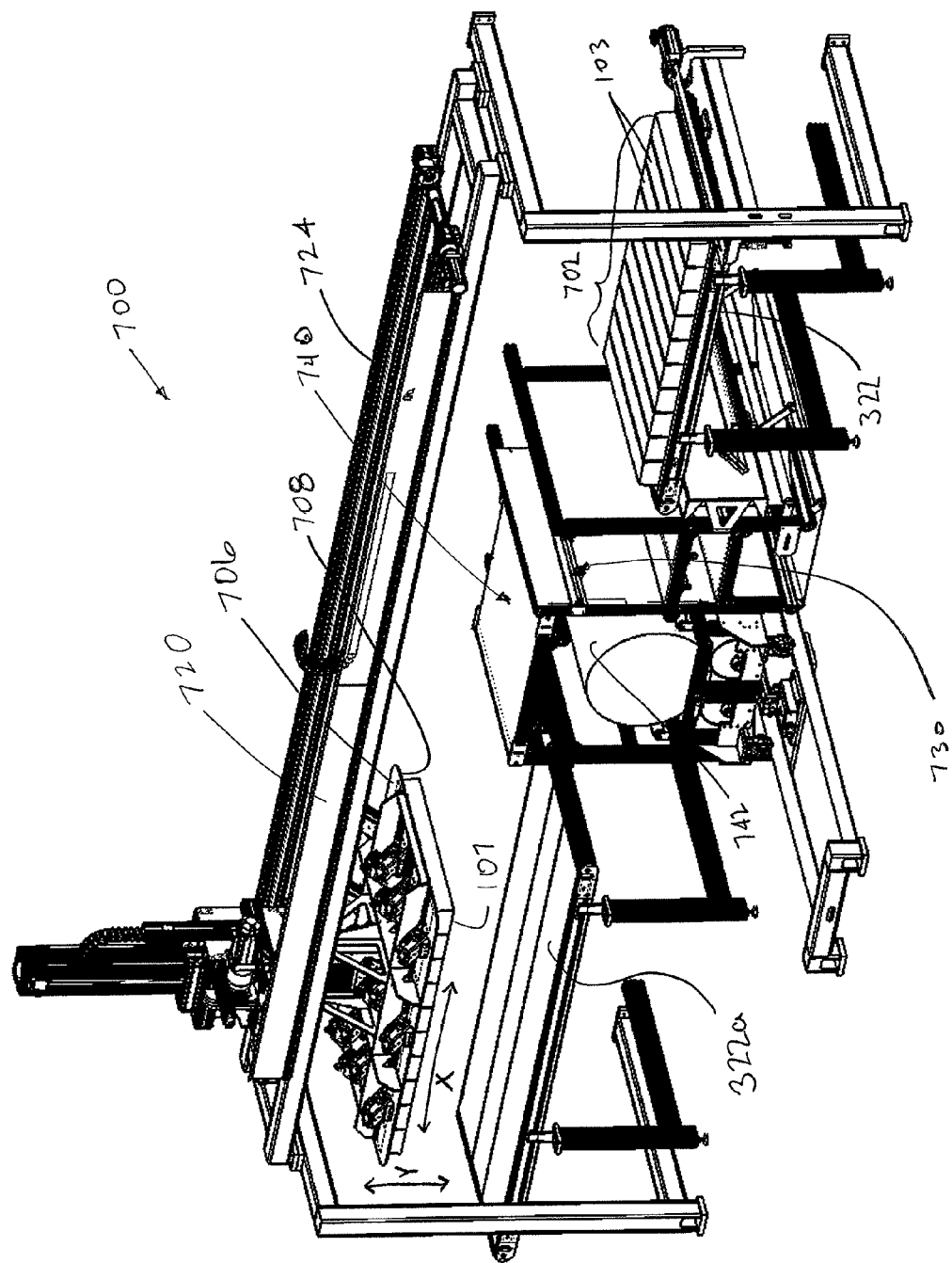
FIG. 14 is a perspective view of the adhesive zone.

On arrival in a pickup area 702 as shown in FIG. 14, a pickup machine 720, which includes a lifting head 706 that is preferably raised and lowered along direction Y and that travels on rails 724 preferably along direction X, aligns the lifting head 706 over the pickup zone 702 where the accumulated pieces 103 are positioned.

The lifting head 706 then lowers until its lifting face 708 contacts the accumulated pieces 103, and in a manner similar to the stacking zone head 306, pins extend into the accumulated pieces 103 to secure them to the lifting face 708. The lifting head 706 then lifts the pieces 103 and raises them as they pass over adhesive application nozzles 730 that apply adhesive to the long side 106 of the pieces. The adhesive may be a high temperature pressure sensitive contact adhesive or an any other suitable adhesive for attaching a backing. The lifting head 706 continues to move the pieces 103 along its rails 724 over a backing station 740, where a backing 742, which can also have adhesive applied to its face, is applied to the entire group of accumulated pieces 103, such that the adhesive on the accumulated pieces 103 adheres to the backing 742, effectively joining all the accumulated pieces 103 together. Without limitation, the backing 742 may be fiberglass, fabric, aluminum, or some type of composite or combination of the foregoing. Alternatively, the backing 742 may be laid on the conveyor 322 and the pieces 103 are applied to the backing 742 on the conveyor 322a.

With the backing 742 applied and the accumulated pieces 103 now joined, an insulating panel 107 has been formed. The conveyor 322a moves the insulating panel 107 through another adhesive application area 770 (shown in FIG. 2), where adhesive may be applied to the gaps that exist between adjacent short sides 108. This adhesive can be the same as the previously described adhesive applied in the adhesive zone 700 or can be of a less permanent type, and is meant to allow the gaps to seal more tightly when the panel 107 is wrapped around a pipe, as shown in FIG. 16.

Unloading Zone 800

Figure 15:
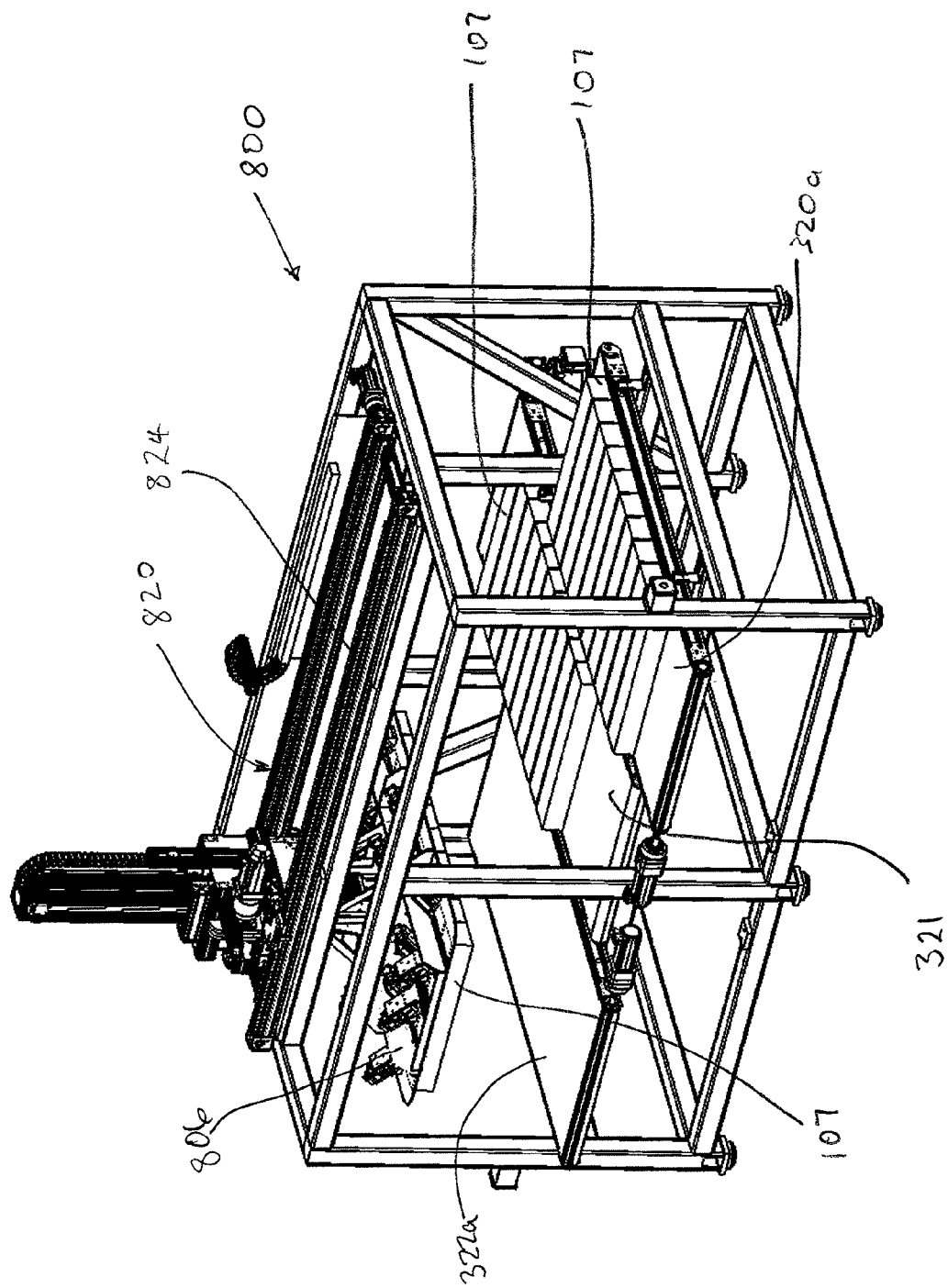
FIG. 15 is a perspective view of the unloading zone.

FIG. 15 shows the unloading zone 800, where an unloading machine 820 lowers its head 806 onto panels 107 that arrive on conveyors 322a and 320a, picks them up, and deposits them in alternating fashion onto an unloading conveyor 321, where they exit the V groove insulation machine 200. The unloading machine head 806, runs along rails 824 so that it can lower itself onto the panels 107 that arrive in the unloading zone 800. In other respects, including the use of pins and a lifting face, the machine head 806 is similar to the heads 306 and 706.

Figure 16:
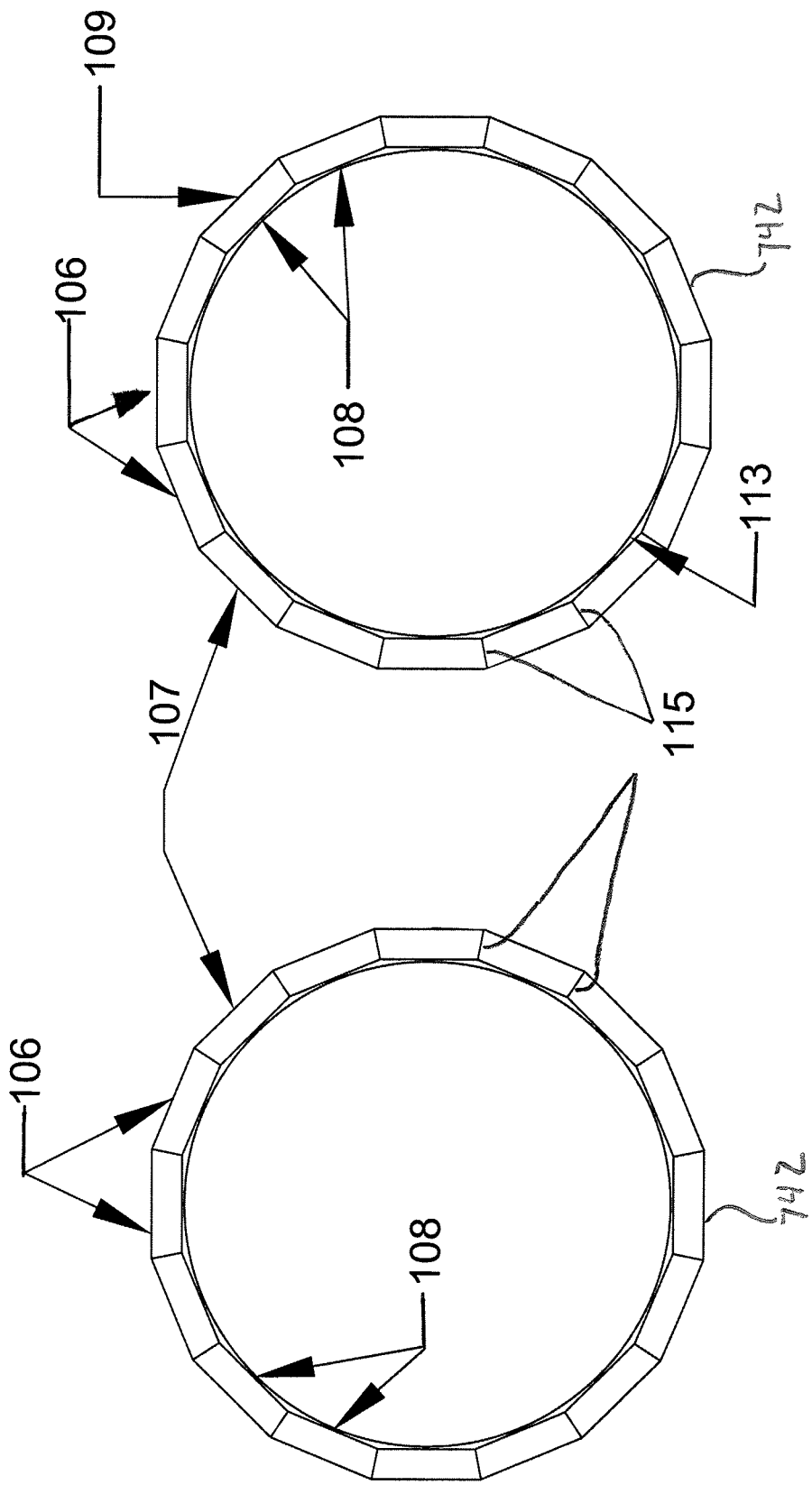
FIG. 16 shows two side elevations of the insulating panel wrapped around itself and a pipe, respectively.

As shown in FIG. 16, in use, the panel 107 wraps around a pipe 113 with its backing 742 side 109 facing outwards, and the former gaps 115 closed and sealed with the adhesive applied to them in the adhesive station 770.

Different size pipes may require different size panels, and the angles and number and size of pieces will vary with design requirements. Further, although the present machine 200 shows two parallel conveyors, more or only one may be used depending on the specifications desired.

For clarity sake, in some figures, certain machines and elements have been removed from the views to focus the viewer's attention on the feature(s) being described.

While various methods, configurations, and features of the present invention have been described above and shown in the drawings, one of ordinary skill in the art will appreciate from this disclosure that any combination of the above features can be used without departing from the scope of the present invention. It is also recognized by those skilled in the art that changes may be made to the above described methods and embodiments without departing from the broad inventive concept thereof.

What is claimed is:

1. A machine for forming insulating panels from pieces comprising:
   a moving device which moves in a first direction;
   a cutting head positioned along the moving device that cuts a sheet panel positioned on the moving device at an angle into a plurality of consecutively cut pieces, wherein every other cut piece comprises a first group of pieces and the remaining cut pieces comprise a second group of pieces;
   a plurality of pushing arms positioned along the moving device and spaced apart by a distance that is width of approximately of two cut pieces such that the plurality of pushing arms move a plurality of the first group of pieces in a second direction generally perpendicular to the first direction from the moving device past a plurality of fingers onto a rotatable support of a flipping machine while the second group of pieces remain on the moving device, the fingers block the second group of pieces from movement in the second direction into the flipping machine; and
   the flipping machine rotates the plurality of the first group of pieces 180 degrees and releases the plurality of the first group of pieces for further processing.

2. The machine of claim 1, further comprising:
   a stacking zone where the sheet panels are loaded onto the moving device that moves the sheet panel to the cutting head.

3. The machine of claim 2, wherein individual sheet panels have adhesive applied to at least one end thereof and are joined together to form a continuous feed of panels along the moving device.

4. The machine of claim 3, wherein the panels are moved from a stack of panels to the moving device using a movable stacking head.

5. The machine of claim 4, wherein the stacking head engages a panel to a lifting face using pins that extend into a top panel on the stack.

6. The machine of claim 5, wherein the stacking head removes a panel from the lifting face and deposits the panel on the moving device by removing the pins from the panel.

7. The machine of claim 1, wherein the cutting head cuts the sheet panel using high pressure water jets or saw blades.

8. The machine of claim 1, wherein the flipping machine releases the first group of pieces on a second moving device for further processing.

9. The machine of claim 1, wherein the flipping machine releases the first group of pieces onto the moving device.

10. The machine of claim 1, wherein the flipping machine holds the first group of pieces between two plates, and wherein after rotating the first group of pieces 180 degrees, a top one of the two plates is level with the moving device.

11. The machine of claim 1, further comprising an accumulation zone that gathers the first and second groups of pieces together and aligns edges of the pieces.

12. The machine of claim 11, further comprising a pickup machine that includes a lifting head that picks up the gathered and aligned pieces and moves the gathered aligned pieces to an adhesive zone.

13. The machine of claim 12, wherein the lifting head engages the gathered and aligned pieces to a lifting face using pins that extend into the gathered and aligned pieces.

14. The machine of claim 1, further comprising an adhesive zone including an adhesive application area that deposits adhesive onto the first and second groups of pieces.

15. The machine of claim 14, further comprising attaching a common backing that is applied to the first and second groups of pieces together into the insulated panel.

16. The machine of claim 15, further comprising an area where adhesive is applied to gaps between pieces on the insulated panel.

17. A machine for forming insulating panels from pieces comprising:
a machine frame;
a conveyor positioned along the machine frame which moves in a first direction;
a cutting head positioned along the machine frame that cuts a sheet panel positioned on the conveyor at an angle into a plurality of consecutively cut pieces having a generally triangular or trapezoidal shape, each of the cut pieces having a short side face and an opposing long side face, wherein every other cut piece comprises a first group of pieces and the remaining cut pieces comprise a second group of pieces, the first group of pieces having their long side face adjacent the conveyor, the second group of pieces having their short side face adjacent the conveyor;
a plurality of pushing arms positioned along the machine frame and above the moving device, the plurality of pushing arms being spaced apart by a distance that is width of approximately two cut pieces such that the plurality of pushing arms move a plurality of the second group of pieces in a second direction generally perpendicular to the first direction from the moving device between two rotatable support plates of a flipping machine while the first group of pieces remain on the moving device; and
the flipping machine rotates the plurality of the second group of pieces 180 degrees and has a push bar to release the plurality of the second group of pieces for further processing.

18. A machine for forming insulating panels from pieces comprising:
a first moving device which moves in a first direction;
a cutting head positioned along the first moving device that cuts a sheet panel positioned on the first moving device at an angle into a plurality of consecutively cut pieces having a generally triangular or trapezoidal shape, wherein every other cut piece comprises a first group of pieces and the remaining cut pieces comprise a second group of pieces;
a plurality of pushing arms positioned along the moving device and spaced apart such that the plurality of pushing arms move a plurality of the second group of pieces in a second direction generally perpendicular to the first direction from the first moving device between two rotatable support plates of a flipping machine while the first group of pieces remain on the first moving device;
the flipping machine rotates the second group of pieces 180 degrees and has a push bar to release the second group of pieces onto a second moving device for further processing;
accumulation paddles positioned along the first and second moving devices, the accumulation paddles are movable between interfering and non-interfering positions, wherein when the accumulation paddles are in the interfering position they gather together a plurality of the first group of pieces along the first moving device and a plurality of the second group of pieces along the second moving device and align edges of the plurality of the first group of pieces and the plurality of the second group of pieces; and
a backing machine positioned along the first and second moving devices, the backing machine comprising at least one adhesive sprayer to spray adhesive onto at least one of a backing material and the plurality of the first group of pieces and the plurality of the second group of pieces, the backing machine attaching a backing material to the plurality of the first group of pieces and the plurality of the second group of pieces to form insulation panels.

* * * * *